Patented Oct. 28, 1952

2,615,813

UNITED STATES PATENT OFFICE 2,615,813

PROCESS FOR DECOLORIZING AND STERILIZING SPICES

Bernard T. Malter, Los Angeles, Calif., assignor of one-half to Oscar Salenger, Beverly Hills, Calif.

No Drawing. Application December 23, 1949, Serial No. 134,870

12 Claims. (Cl. 99—140)

This invention relates to a process for decolorizing and sterilizing natural spices including those commonly known as peppers, nutmeg, cloves and the like.

Among the problems involved in the use of peppers or like natural spices are (a) the fact that such peppers or like natural spices generally have a color which is objectionable to users thereof such, for example, as manufacturers of sausage and like meat food products; and (b) peppers and like natural spices are commonly not sterile and frequently bear certain bacteria which are harmful to meat and like food products so that when used in sausage or other meat food products they tend to cause bacterial contamination of such meat food products.

It has been proposed heretofore to overcome the foregoing and other objectionable features incidental to the use of peppers, and like natural spices, including nutmeg, cloves, and the like, by subjecting them to an oxidation process, but such prior procedures have not, insofar as I am aware, been satisfactory due, in part, to the fact that such prior oxidation processes are detrimental to those natural constituents of the peppers or like natural spices which impart desirable properties and characteristics thereto including flavor, aroma and "bite."

Accordingly, an object of the present invention is to provide a new and improved process for decolorizing and sterilizing natural spices of the character generally known as peppers, as well as nutmeg, cloves, and the like, and without damaging those natural constituents of the pepper or other natural spices which impart desirable advantages and characteristics thereto, including flavor, aroma and "bite."

Another object of the present invention is to provide the herein described novel process in which the fibrous material in the natural spices treated is separated from the natural resins and oils in the spices, the fibrous material then subjected to the action of an oxidizing agent to bleach the black and red pigments and other undesirable constituents therein, in the absence of the natural resins and oils, and the natural resins and oils then recombined with the thus bleached fibrous material in the natural spices.

An additional object of the invention is to provide a novel process for decolorizing and sterilizing natural spices of the character commonly known as peppers, as well as nutmeg, cloves, and the like, and in which the green chlorophyll-type pigments in the pepper, or other spice, and the oleoresinous material and essential oils, are solvent-extracted from the finely divided peppers, or other natural spice, and filtered therefrom, the residue or filter cake then bleached by oxidation to eliminate the black and red pigment materials in the pepper, or other natural spices, and the oleoresinous material and essential oils then returned to and dispersed throughout the finely divided pepper or like natural spice particles, to the end that the resultant cream-colored or light brown colored pepper or like natural spice product, thus prepared is essentially the same as the original natural pepper or like natural spice except that it has been decolorized by elimination of the green, black and red pigments and has been sterilized.

Other objects will appear hereinafter.

A typical procedure which may be followed in the practice of the present invention is illustrated in the following example in which all parts indicated are by weight:

*Example No. 1*

100 parts of ground pepper berry, approximately 60 mesh, in size, are mixed with 400 parts of a suitable solvent such, for example, as trichlorethylene, and the resulting mixture or slurry is then heated to a temperature of 60° C. and maintained at this temperature for a period of two hours. The solvent-extracted material or so-called miscella, is then filtered or strained from the ground pepper residue or filter cake. 400 parts of the selected solvent, such as trichlorethylene, are then added to the thus once extracted ground pepper residue or filter cake and the resulting mixture or slurry is then heated to a temperature of 60° C. and maintained at this temperature for a period of three hours, after which the solvent-extracted material or so-called miscella is filtered or strained from the thus twice extracted solid ground pepper residue or filter cake. This solvent-extraction step is repeated two additional times at the same temperature and for a period of three hours at each step, the solvent-extracted material or so-called miscella being filtered or strained from the ground pepper residue or filter cake after each solvent extraction step. The solvent-extracted filtrate materials or so-called miscella from all four solvent extraction steps, which is green in color and contains the solvent-extracted essential oils and oleoresinous materials extracted from the natural pepper berry, are then intermixed and approximately five parts of finely divided decolorizing carbon are added thereto and intimately mixed therewith, whereupon the green coloring material in the solvent-extracted filtrate material or so-called miscella is removed and the filtrate material or so-called miscella becomes brown in color. The mixture of miscella and carbon is then filtered to remove the carbon.

To the thus extracted ground pepper residue or filter cake I then add 5 parts of a 30 per cent aqueous solution of hydrogen peroxide ($H_2O_2$). The mixture or slurry thus formed is then heated above atmospheric temperature, the temperature depending somewhat upon pressure, and being kept as low as possible. Thus, for example, I have found that at a pressure of 20 mm. of mercury the mixture or slurry may be heated to a temperature of approximately 50° C. and is maintained at this temperature, with constant stirring, for a period of one hour, at atmospheric pressure or in vacuo, as desired, thereby effectively bleaching the fibrous material in the pepper residue or filter cake. The decolorized filtrate material or so-called miscella is then added to the thus treated and bleached ground pepper residue or filter cake, with continuous and constant agitation, whereupon the water and trichlorethylene solvent are evaporated in vacuo, preferably with mild heating.

The resulting dry pepper, thus prepared, and which is cream-colored or light brown in color, is essentially the same as the original pepper except that it has been decolorized, by removal of the solvent-extracted objectionable coloring materials, and has been sterilized, and is a highly desirable product for use in the preparation of meats and other food products.

I have found that in the practice of the present invention the addition of the solvent-extracted oleoresinous coloring material or miscella to the mass of solid pepper particles or residue, without first extracting the trichlorethylene solvent, enables the oleoresinous materials and essential oils in the miscella completely to penetrate and to be returned to the pepper particles in the residue or filter cake throughout the entire cross-sectional area thereof, and in the absence of the pigments originally present in the pepper, rather than merely being deposited on the surface of the pepper particles, as would be the case if the trichlorethylene solvent were evaporated from the solvent-extracted oleoresinous material and coloring material or filtrate prior to mixing the latter with the mass of finely divided pepper particles in the residue.

It will be noted, in this connection, that the treatment of the solvent-extracted miscella with decolorizing carbon removes the green or chlorophyll-type pigments from the oleoresinous material and essential oils in the filtrate while the oxidation of the residue or filter cake decolorizes the black and red pigment materials which are initially present in the pepper.

An important aspect of the present invention is the step of oxidizing or bleaching the filter cake in the absence of the oleoresinous material and essential oils in the filtrate or miscella permits the bleaching operation to be effected upon the fibrous matter and the black and red pigments and other undesirable constituents of the pepper, in the filter cake, without danger of damaging the desirable constituents thereof.

While a solution of hydrogen peroxide, as specified, has been found to be a very suitable oxidizing or bleaching agent it is to be understood that other suitable oxidizing or bleaching agents may be used in place thereof.

*Example No. 2*

The same procedures and the same quantities may be employed as in Example No. 1 except that in place of pepper a different natural spice, namely, nutmeg, may be employed.

*Example No. 3*

The same procedures and the same quantities may be employed as in Example No. 1 except that in place of pepper a different natural spice, namely, cloves, may be employed.

In place of the trichlorethylene solvent specified in the foregoing Examples Nos. 1, 2 and 3 I may employ other suitable solvents such as, for example, as ethylene dichloride, carbon tetrachloride, ether and benzene.

While the temperature of 60° C. employed during the four solvent extraction steps, referred to above, has been found very satisfactory for use in solvent extraction by percolation of large bottles at atmospheric pressure for the time intervals specified, these conditions may be varied considerably without departing from the scope or purview of the present invention or a continuous solvent extraction system may be employed, if desired.

It will thus be seen from the foregoing description that the present invention provides a new and improved process for decolorizing and sterilizing natural spices including those generally known as peppers, nutmeg, cloves, and the like, and that the invention thus has the desirable advantages and characteristics, and accomplishes its intended objects, including those hereinbefore pointed out and others which are inherent in the invention.

I claim:

1. A process for decolorizing and sterilizing natural spices which comprises the steps of finely dividing a mass of natural spice containing fibrous spice particles, heating the mass of finely divided spice particles thus formed, and subjecting it to the action of a solvent so as to extract the green chlorophyll-type pigments and the oleoresinous material and essential oils therefrom, filtering the thus extracted green chlorophyll-type pigment, oleoresinous material, and essential oils, from the residue or filter cake containing undissolved fibrous spice particles, removing the green chlorophyll-type pigment from the filtrate by means of a decolorizing agent, subjecting the residue or filter cake containing the undissolved fibrous spice particles to the action of an oxidizing agent so as to bleach the black and red pigments in the fibrous spice particles in the filter cake in the absence of the said oleoresinous material and other essential oils, thoroughly intermixing the thus bleached fibrous spice particles in the filter cake with the filtrate, from which the green chlorophyll-type pigment has been removed, so as to thoroughly impregnate the bleached fibrous spice particles in the residue or filter cake with the oleoresinous materials and essential oils in the filtrate, and then removing the solvent and water from the thus treated finely divided spice particles in the filter cake.

2. The process defined in claim 1 in which the natural spice is a pepper and in which the solvent employed is trichlorethylene.

3. The process defined in claim 1 in which the natural spice is a pepper and in which the solvent employed is trichlorethylene, and in which the solvent extraction of the green chlorophyll type pigment and oleoresinous material and essential oils is carried out at a temperature of about 60° C.

4. The process defined in claim 1 in which the natural spice is nutmeg and in which the solvent employed is trichlorethylene.

5. The process defined in claim 1 in which the natural spice is cloves and in which the solvent employed is trichlorethylene.

6. The process defined in claim 1 in which the solvent employed is trichlorethylene, in the ratio of approximately 100 parts of finely divided spice to 400 parts of trichlorethylene, and in which the solvent extraction of the green chlorophyll-type pigment and oleoresinous material and essential oils is carried out at a temperature of about 60° C.

7. The process defined in claim 1 in which the solvent employed is trichlorethylene, in the ratio of approximately 100 parts of finely divided spice to 400 parts of trichlorethylene, and in which the solvent extraction of the green chlorophyll-type pigment and oleoresinous material and essential oils is carried out at a temperature of about 60° C., and in which the solvent extraction with trichlorethylene is carried out in successive steps of 2 hours, 3 hours, 3 hours and 3 hours, at the temperature stated, with filtering and addition of trichlorethylene, in the quantity indicated, at the commencement of each step.

8. The process defined in claim 1 in which the solvent employed is trichlorethylene, in the ratio of approximately 100 parts of finely divided spice to 400 parts of trichlorethylene, and in which the solvent extraction of the green chlorophyll-type pigment and oleoresinous material and essential oils is carried out at a temperature of about 60° C., and in which the solvent extraction with trichlorethylene is carried out in successive steps of 2 hours, 3 hours, 3 hours and 3 hours, at the temperature stated, with filtering and addition of trichlorethylene, in the quantity indicated, at the commencement of each step, and in which the green chlorophyll-type pigment is removed from the filtrate by passing the filtrate through finely divided decolorizing carbon.

9. The process defined in claim 1 in which the solvent employed is trichlorethylene, in the ratio of approximately 100 parts of finely divided pepper berries to 400 parts of trichlorethylene, and in which the solvent extraction of the green chlorophyll-type pigment and oleoresinous material and essential oils is carried out at a temperature of about 60° C., and in which the solvent extraction with trichlorethylene is carried out in successive steps of 2 hours, 3 hours, 3 hours and 3 hours, at the temperature stated, with filtering and addition of trichlorethylene, in the quantity indicated, at the commencement of each step, and in which the green chlorophyll-type pigment is removed from the filtrate by passing the filtrate through finely divided decolorizing carbon, and in which the filter cake is subjected to the action of an oxidizing bleaching agent so as to bleach the black and red pigment materials in the pepper particles in the filter cake, and in which the thus bleached filter cake is then thoroughly mixed with the filtrate, from which the green chlorophyll-type pigment material has been removed, so as to thoroughly impregnate the finely divided and bleached pepper particles in the filter cake with the oleoresinous material and essential oils in the filtrate.

10. The process defined in claim 1 in which the solvent employed is trichlorethylene, in the ratio of approximately 100 parts of finely divided pepper berries to 400 parts of trichlorethylene, and in which the solvent extraction of the green chlorophyll-type pigment and oleoresinous material and essential oils is carried out at a temperature of about 60° C., and in which the solvent extraction with trichlorethylene is carried out in successive steps of 2 hours, 3 hours, 3 hours and 3 hours, at the temperature stated, with filtering and addition of trichlorethylene, in the quantity indicated, at the commencement of each step, and in which the green chlorophyll-type pigment is removed from the filtrate by passing the filtrate through finely divided decolorizing carbon, and in which the filter cake is subjected to the action of an oxidizing bleaching agent in the form of a 30 per cent aqueous solution of hydrogen peroxide so as to bleach the black and red pigment materials in the pepper particles in the filter cake, and in which the thus bleached filter cake is then thoroughly mixed with the filtrate, from which the green chlorophyll-type pigment material has been removed, so as to thoroughly impregnate the finely divided and bleached pepper particles in the filter cake with the oleoresinous material and essential oils in the filtrate.

11. The process defined in claim 1 in which the solvent employed is trichlorethylene, in the ratio of approximately 100 parts of finely divided pepper berries to 400 parts of trichlorethylene, and in which the solvent extraction of the green chlorophyll-type pigment and oleoresinous material and essential oils is carried out at a temperature of about 60° C., and in which the solvent extraction with trichlorethylene is carried out in successive steps of 2 hours, 3 hours, 3 hours and 3 hours, at the temperature stated, with filtering and addition of trichlorethylene, in the quantity indicated, at the commencement of each step, and in which the green chlorophyll-type pigment is removed from the filtrate by passing the filtrate through finely divided decolorizing carbon, and in which the filter cake is subjected to the action of an oxidizing bleaching agent in the form of a 30 per cent aqueous solution of hydrogen peroxide and heated at a temperature of about 50° C. for a period of about one hour, at atmospheric pressure, so as to bleach the black and red pigment materials in the pepper particles in the filter cake, and in which the thus bleached filter cake is then thoroughly mixed with the filtrate, from which the green chlorophyll-type pigment material has been removed, so as to thoroughly impregnate the finely divided and bleached pepper particles in the filter cake with the oleoresinous material and essential oils in the filtrate.

12. The process defined in claim 1 in which the solvent employed is trichlorethylene, in the ratio of approximately 100 parts of finely divided pepper berries to 400 parts of trichlorethylene, and in which the solvent extraction of the green chlorophyll-type pigment and oleoresinous material and essential oils is carried out at a temperature of about 60° C., and in which the solvent extraction with trichlorethylene is carried out in successive steps of 2 hours, 3 hours, 3 hours and 3 hours, at the temperature stated, with filtering and addition of trichlorethylene, in the quantity indicated, at the commencement of each step, and in which the green chlorophyll-type pigment is removed from the filtrate by passing the filtrate through finely divided decolorizing carbon, and in which the filter cake is subjected to the action of an oxidizing bleaching agent so as to bleach the black and red pigment materials in the pepper particles in the filter cake, and in which the thus bleached filter cake is then thoroughly mixed with the filtrate, from which the green chlorophyll-type pigment material has been removed, so as to thoroughly impregnate the finely divided and bleached pepper particles in the filter cake with the oleoresinous material and essential oils in the filtrate, and in which the water and trichlorethylene solvent are then removed from the mass of thus bleached and impregnated pepper particles by heating the said mass in vacuo under mild heat.

BERNARD T. MALTER.

REFERENCES CITED

The following references are of record in the file of this patent:

UNITED STATES PATENTS

| Number | Name | Date |
|---|---|---|
| 2,079,415 | Levinson | May 4, 1937 |
| 2,097,405 | Hall | Oct. 26, 1937 |
| 2,170,954 | Stange | Aug. 29, 1939 |
| 2,384,532 | Bush et al. | Sept. 11, 1945 |